(12) United States Patent
Lavastre et al.

(10) Patent No.: US 7,300,901 B2
(45) Date of Patent: Nov. 27, 2007

(54) HOLLOW BEADS OF POLYETHYLENE

(75) Inventors: Olivier Lavastre, Gahard (FR); Laurent Gallard, Villiers sur Chizé (FR)

(73) Assignee: Total Petrochemicals Research Feluy, Feluy (BG)

( * ) Notice: Subject to any disclaimer, the term of this patent is extended or adjusted under 35 U.S.C. 154(b) by 0 days.

(21) Appl. No.: 10/552,241

(22) PCT Filed: Apr. 7, 2004

(86) PCT No.: PCT/EP2004/050481

§ 371 (c)(1),
(2), (4) Date: Sep. 7, 2006

(87) PCT Pub. No.: WO2004/090000

PCT Pub. Date: Oct. 21, 2004

(65) Prior Publication Data

US 2007/0054799 A1    Mar. 8, 2007

(30) Foreign Application Priority Data

Apr. 14, 2003  (FR) .................................. 03 04617

(51) Int. Cl.
*C08F 4/02* (2006.01)
*C08F 4/70* (2006.01)

(52) U.S. Cl. ...................... 502/109; 502/159; 502/167; 526/161; 526/169.1; 526/172

(58) Field of Classification Search ................ 526/161, 526/172, 169.1; 502/109, 118, 167, 159
See application file for complete search history.

*Primary Examiner*—Caixia Lu
(74) *Attorney, Agent, or Firm*—William D. Jackson; Catherine P. Schmidt

(57) ABSTRACT

The present invention discloses a method for preparing hollow beads of polyethylene of controlled morphology and size.

6 Claims, 4 Drawing Sheets

HOLLOW BEADS OF POLYETHYLENE

This invention is related to the field of hollow beads of polyethylene and their method of preparation. It also relates to the catalyst components used in their preparation.

Iron-based catalyst systems have been described in literature for the polymerization or oligomerisation of olefins.

For example by Britovsek et al. (G. J. P. Britovsek, V. C. Gibson, B. S. Kimberlay, P. J. Maddox, S. J. McTavish, G. A. Solan, A. J. P. White and D. J. Williams, in Chem. Comm., 1998, 849.) describe novel olefin polymerization catalysts based on iron and cobalt that are active for the polymerization of olefins, particularly ethylene.

Small, Brookhart and Bennett (B. L. Small, M. Brookhart and A. M. A. Bennett, in J. Am. Chem. Soc., 1998, 4049.) describe an iron and cobalt catalysts that are very active for the polymerisation of ethylene.

Small and Brookhart (B. L. Small and M. Brookhart, in Macromolecules, 1999, 2120.) disclose a new generation of iron catalysts for the polymerization of propylene.

Some other research groups such as for example Roscoe et al. (S. B. Roscoe, J. M. Fréchet, J. F. Watzer and A. J. Dias, in Science, 1998, vol. 280, 270.) have been able to produce polyolefin spheres from metallocenes supported on non-interacting polystyrene support.

Liu and Jin (C. Liu and G. Jin, in New J. Chem. 2002, 1485.) disclose a method for immobilizing an iron-based catalyst on polystyrene chains.

None of these prior art documents have addressed the problem of preparing hollow beads of polyethylene of controlled morphology and size.

The present invention discloses a method for preparing hollow beads of polyethylene of controlled morphology and size.

The present invention also discloses a supported iron-based catalyst component very active in the preparation hollow beads of polyethylene.

The present invention further discloses a method for preparing the supported iron-based catalyst component.

Accordingly, the present invention discloses a method for preparing hollow beads of polyethylene of controlled morphology and size that comprises the steps of:

a) providing a supported catalyst component wherein the support is a porous functionalised bead of polystyrene and wherein the catalyst component is covalently bound to the support and is an iron based complex of general formula I

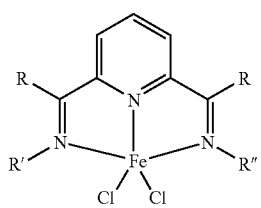
(I)

wherein R is the same and is an alkyl having from 1 to 20 carbon atoms and wherein R' and R" are the same or different and are a substituted or unsubstituted alkyl having from 1 to 20 carbon atoms, or a unsubstituted or substituted aryl having substituents from 1 to 20 carbon atoms;

b) activating the supported catalyst with a suitable activating agent;
c) feeding the ethylene monomer,
d) maintaining under polymerization conditions;
e) retrieving hollow beads of polyethylene of controlled morphology and size.

R are the same and are preferably an alkyl having from 1 to 4 carbon atoms, more preferably, it is methyl.

R' and R" are the same or different and are selected from a substituted or unsubstituted alkyl having from 1 to 6 carbon atoms or are a unsubsttuted or substituted aryl having substituents from 1 to 6 carbon atoms. Preferably, R' and R" are the same and are phenyls. The substitutents on the phenyls, if present, can have either an inductive attracting, donating effect or a steric effect.

The substituents that have an inductive attracting or donating effect can be selected from hydrogen or an alkoxy, or NO2, or CN, or CO2R or an alkyl having from 1 to 20 carbon atoms, or a halogen or CX3 wherein X is a halogen, preferably fluor, or a fused ring between positions 3 and 4, or between positions 4 and 5 or between positions 5 and 6.

The steric environment of the iron-based complex is determined by the substituents at positions 2 and 6 and optionally at positions 3, 4 and 5 on the phenyls.

For the steric effect, the preferred substituents on the phenyls, if present can be selected from tert-butyl, isopropyl or methyl. The most preferred substituents are isopropyl in positions 2 and 6 or methyl in positions 2, 4 and 6.

The present invention discloses a supported catalyst component, very active in the preparation of hollow beads of polyethylene of controlled morphology and size, that comprises a support prepared from a porous bead of functionalised polystyrene and an iron-based complex covalently bound to the support by a flexible arm, said flexible arm being a substituted or unsubstituted alkyl having a length of from 2 to 18 carbon atoms.

Preferably the flexible arm is an unsubstituted alkyl having from 3 to 6 carbon atoms.

The present invention also discloses a method for preparing the supported catalyst component that comprises the steps of:

a) providing a first component of general formula II

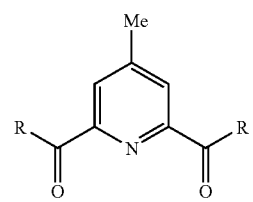
(II)

wherein R is the same and is an alkyl having from 1 to 20 carbon atoms;

b) providing a porous functionalised bead of polystyrene of the general formula III

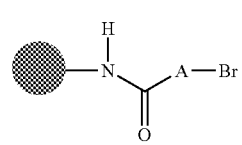
(III)

wherein the flexible arm A is a substituted or unsubstituted alkyl having from 2 to 18 carbon atoms;

c) creating a covalent bond between the component of step a) and the porous functionalised bead of step b) to produce a complex of formula IV

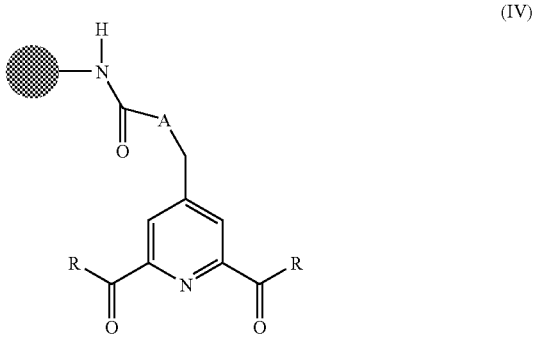

(IV)

d) reacting the supported component of step c) with a first alkyl- or aryl-amine R'—NH$_2$ and with a second alkyl- or aryl-amine R"—NH$_2$, wherein R' and R" are the same or different, to prepare a bis-imine complex of formula V;

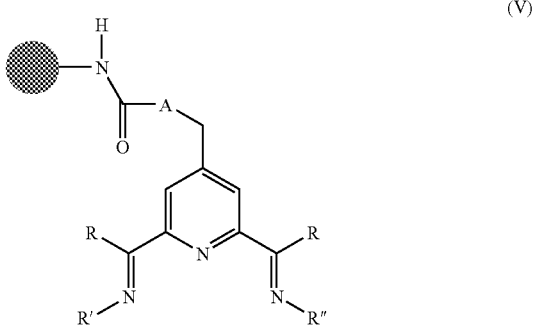

(V)

e) reacting the bis-imine complex of step d) with ferric chloride (FeCl$_2$) in a THF to coordinate the ferric centre and obtain a catalyst component of the general formula VI

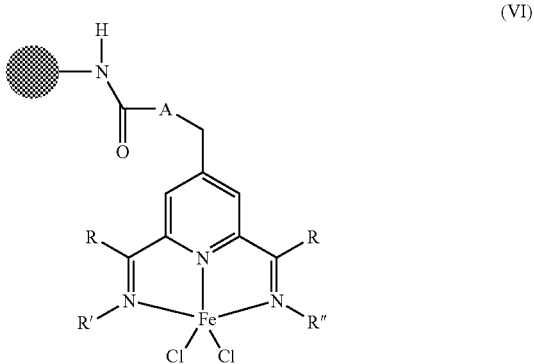

(VI)

All reactions of step e) are carried out under inert atmosphere at room temperature of about 20° C. and under atmospheric pressure. The solvent is then evaporated and dry beads of the supported catalyst component are retrieved.

The starting porous functionalised beads of polystyrene have a size of from 250 to 500 microns and they are prepared from cross linked polystyrene wherein the degree of cross linking is ranging from 0.5 to 5%. A proper level of cross linking must be selected: it must be sufficiently high to insure shape constraint but sufficiently low to allow absorption of the active ingredients. A degree of cross linking of from 1 to 2% is preferred.

A study of the finished supported iron-based catalyst component reveals that the distribution of iron within the compound is not homogeneous: there is a decreasing concentration when going from the surface to the center of the bead as seen in FIG. 1 representing a cross section of a bead of catalyst component.

A catalyst system is then prepared by activating the supported catalyst component with a suitable activating agent.

The activating agent can be selected from aluminoxanes or aluminium.

The aluminium alkyls are of the formula AlR$_x$ and can be used wherein each R is the same or different and is selected from halides or from alkoxy or alkyl groups having from 1 to 12 carbon atoms and x is from 1 to 3. Especially suitable aluminiumalkyl are dialkylaluminum chloride, the most preferred being diethylaluminum chloride (Et2AlCl).

Aluminoxane is used to activate the catalyst component during the polymerisation procedure, and any aluminoxane known in the art is suitable.

The preferred aluminoxanes comprise oligomeric linear and/or cyclic alkyl aluminoxanes represented by the formula:

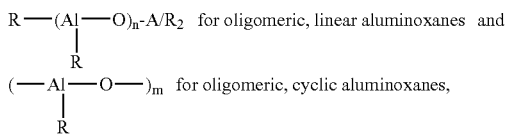

wherein n is 1-40, preferably 10-20, m is 3-40, preferably 3-20 and R is a C$_1$-C$_8$ alkyl group and preferably methyl.

Methylaluminoxane (MAO) is preferably used.

Preferably the activating agent is added in excess to the dry beads of supported catalyst component. The molar ratio [Al]:[Fe] is at least 2000, preferably, at least 2500.

The hollow beads of polyethylene have a diameter of from 0.5 to 5 mm as can be seen on FIG. 2 representing the starting beads of polystyrene and the final beads of polyethylene. The diameter of the hollow beads of polyethylene depends upon the nature of the substituents attached to the phenyl groups R' and R" of the iron-base catalyst component as can be seen on FIG. 3 representing the final beads of polyethylene obtained with various substituents on the phenyl groups. In addition, the beads have a very narrow size distribution.

The catalytic activity is also governed by the nature of the substituents R' and R" on the phenyl groups.

LIST OF FIGURES

FIG. 4 represents a hollow bead of polyethylene.

EXAMPLES

Figure 1:
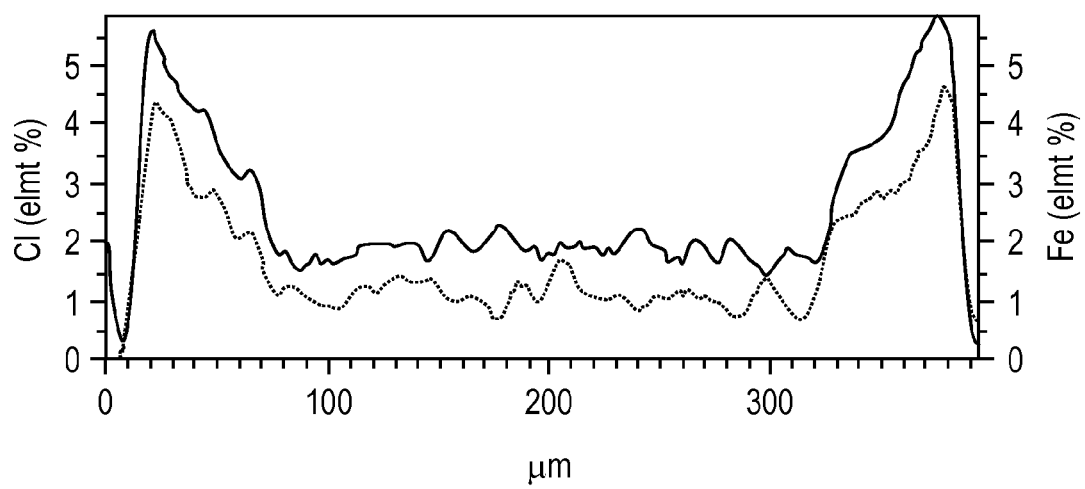
FIG. 1 represents respectively the percentages of iron and of chlorine as a function of distance from the surface along a diameter of a bead of catalyst component measured by a scanning electron microscope (SEM) equipped with a energy dispersive X-ray spectrometer (EDS).
Figure 2:
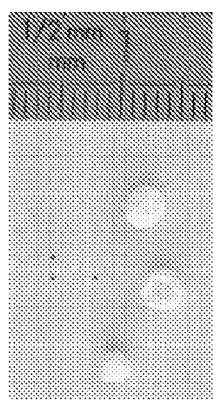
FIG. 2 represents the starting polystyrene beads and the final polyethylene hollow beads.
Figure 3:
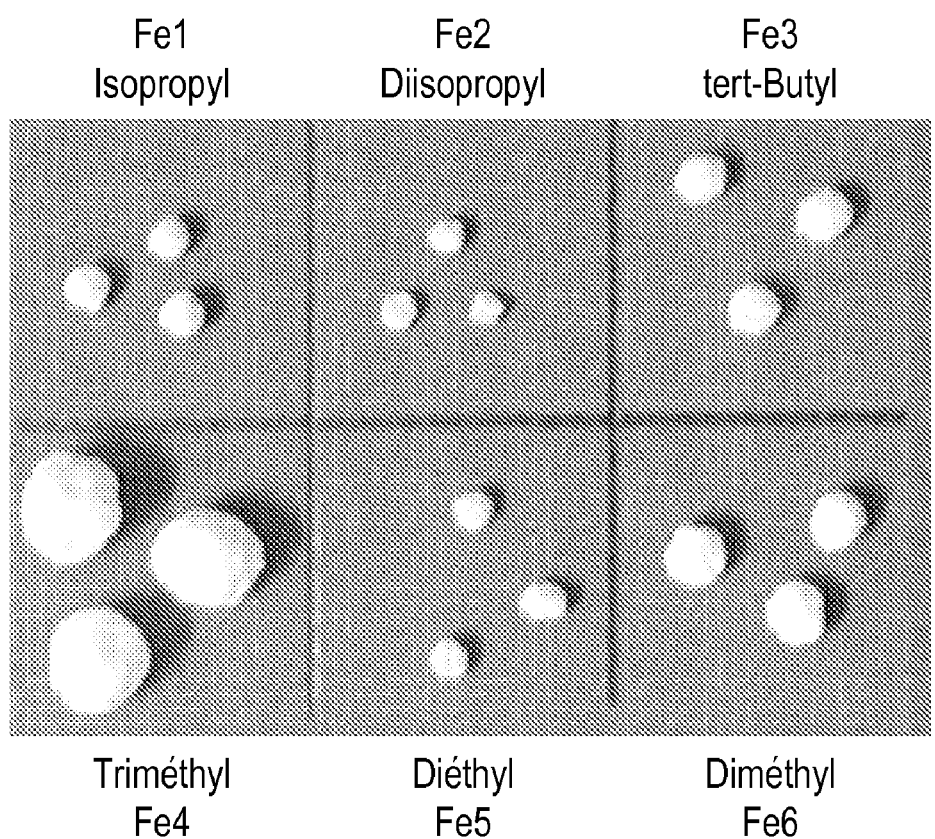
FIG. 3 represents the final polyethylene beads obtained with various substituents on the phenyl groups. The substituents are respectively: isopropyl, diisopropyl, tert-butyl, trimethyl, diethyl and dimethyl.
Figure 4A:
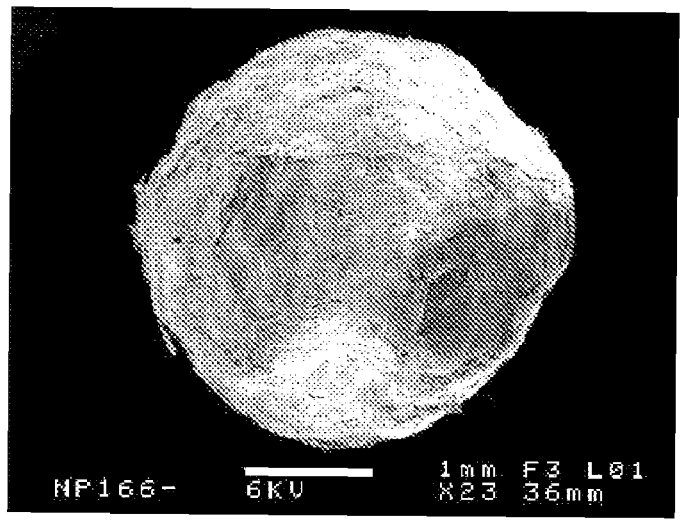
FIG. 4a is an external view and FIG. 4b is an internal view of the bead.
Figure 4B:
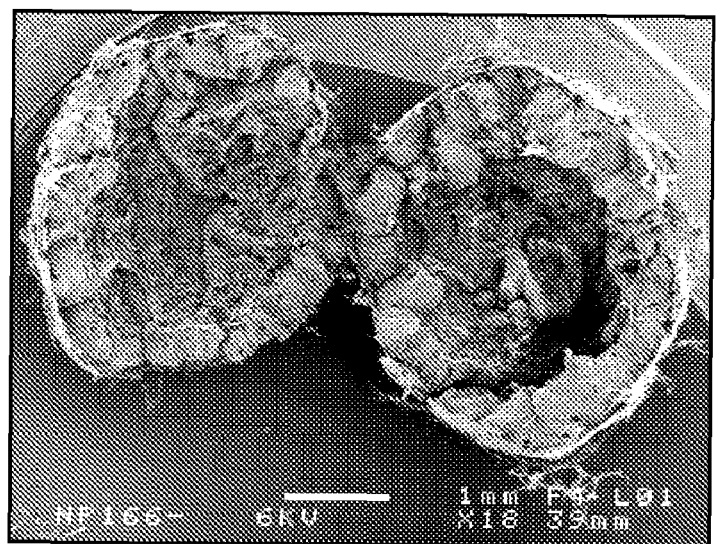

The starting materials and reagents, purchased from commercial suppliers, were used after standard purifications. The solvents were dried and distilled before use as follows:
- over sodium and benzophenone for toluene and tetrahydrofuran (THF),
- over sodium for methanol and
- over phosphorus pentoxide for dichloromethane (DCM)).

Manipulations were all performed on a vacuum line under argon, using standard Schlenk techniques and glove box techniques.

The rotating shaker is a Labquake shaker.

NMR spectra were recorded on a Bruker DPX 200 at 200 MHz (for $^1H$) and 50 MHz (for $^{13}C$).

Infrared ATR (silicium) spectra were recorded in the range 4000-400 $cm^{-1}$ on a IR Centaurµs microscope.

High resolution mass spectra were obtained on a Varian MAT 311 (electronic ionisation mode) at CRMPO, University of Rennes.

Elemental analysis were performed by the CNRS laboratory, Vernaison (France).

Synthesis of the Catalyst

The starting compound 2,6-diacetyl-4-methylpyridine (1) was synthesized according to known methods (see for example T. L. Gilchrist and T. G. Roberts, in J. Chem. Soc., Perkins Trans., 1983, 1283, or T. L. Gilchrist, D. Hughes, W. Stretch and W. J. T. Crystal, in J. Chem. Soc., Perkins Trans., 1987, 2505.)

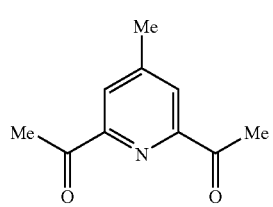

(1)

1.22 g (6.89 mmol) of 2,6-diacetyl methylpyridine (1) were dissolved in 120 ml of dichloromethane (DCM). 2.10 g (11.03 mmol) of para-toluene sulfonic acid were then added followed by 5.2 ml (93.74 mmol) of ethylene glycol. The reaction mixture was stirred at reflux for 3 days at 50° C. It was then cooled to room temperature, dissolved in 50 ml of DCM, washed twice with 200 ml of saturated $NaHCO_3$ and three times with 200 ml of water. The organic phase was dried over magnesium sulfate, filtered and dried under reduced pressure. A column chromatography (silica, DCM as eluent) afforded 1.244 g (4.7 mmol) of compound (2) in 68% yield, as a yellow oil.

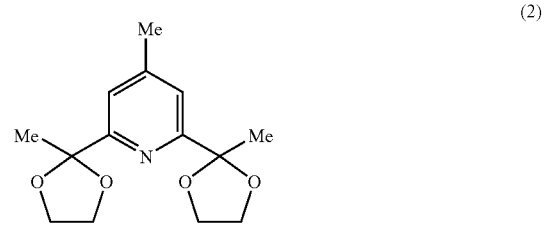

(2)

Under argon, to 200 mg (0.2 mmol) of polystyrene AM-$NH_2$ beads purchased from Rapp Polymere (1 mmole/g, size from 250 to 315 microns) in 3.6 mL of dichloromethane (DCM), 0.44 mL (3.0 mmol) of triethylamine were slowly added, followed by the careful addition of 0.36 mL (2.4 mmol) of 6-bromohexanoyl chloride. The reaction mixture was stirred for 2 h at room temperature on a rotating shaker before being drained. The beads were then washed twice for 30 minutes with dimethylformamide, twice for 10 minutes with DCM, twice for 10 minutes with methanol, twice for 30 minutes with dimethylformamide, twice for 10 minutes with DCM, twice for 30 minutes with methanol and dried under reduced pressure to give 0.2 mmol of the white beads (3). A Kaiser test was performed to verify that the reaction was complete.

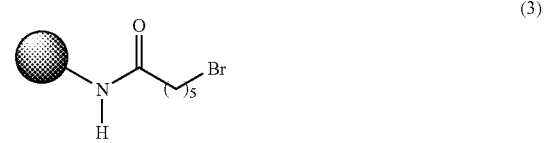

(3)

A solution of lithium diisopropylamine (LDA) was prepared by adding dropwise 0.5 mL (0.66 mmol) of n-butyllithium to a solution, at −20° C., of 0.1 mL (0.72 mmol) of diisopropylamine in 2.2 mL of THF. The dark red solution was stirred at −20° C. for 15 min before being added dropwise to a solution also at −20° C., of 160 mg (0.60 mmol) of complex (2) in 2.2 mL of THF. The orange solution was stirred at −20° C. for 30 min before being added to 0.2 mmol of the beads (3), under argon. The beads were stirred at room temperature on a rotating shaker overnight The beads were then washed with twice for 10 minutes and once for 30 minutes in THF, twice for 10 minutes in dimethylformamide, twice for 5 minutes in DCM, once for 90 minutes in methanol, once for 15 minutes in THF, once for 15 minutes in methanol, once for 15 minutes in THF and then dried under reduced pressure. The procedure was repeated a second time to give 0.2 mmol of the dark yellow beads (4).

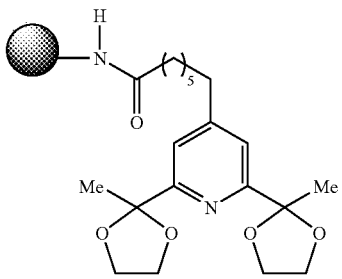

(4)

The deprotection of the beads (4) was performed by dissolving 0.2 mmol of beads (4) in 4 mL of THF in which 2 mL of 10% aqueous HCl were added. The beads became orange. They were stirred at room temperature overnight on a rotating shaker. They were then drained, washed twice for 30 minutes with a 1/1 mixture of THF/water, twice for 15 minutes with methanol, twice for 30 minutes with the 1/1 mixture of THF/water, twice for 15 minutes with methanol and then dried under reduced pressure. The procedure was repeated a second time to give the pale yellow beads (5).

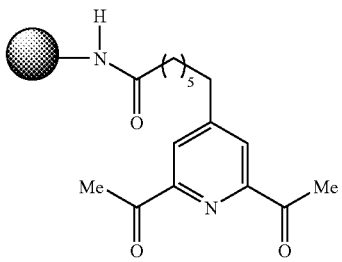

(5)

To a mixture of 0.033 mmol of beads (5) in 0.9 mL of DCM were added 0.028 mL (0.198 mmol) of 2,4,6-trimethylaniline and 1 drop of glacial acetic acid. The beads were stirred at room temperature for 40 h on a rotating shaker. They were then drained, washed twice for 30 minutes with DCM, twice for 30 minutes with methanol and again with DCM respectively for 30 minutes and 2 hours, twice for 30 minutes with methanol and then dried under reduced pressure. The procedure was repeated a second time to give the pale yellow beads (6).

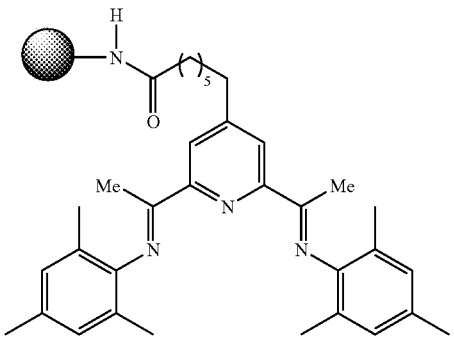

(6)

The following reaction was entirely performed in a glove box. A $4.9 \times 10^{-2}$ M solution of iron(II) dichloride tetrahydrated in DCM and THF was prepared by dissolving 39 mg (0.196 mmol) of iron(II) dichloride tetrahydrated in 1 mL of DCM followed by the addition of 3 mL of THF. To a mixture of 0.01 mmol of beads (6) in 0.3 mL of THF were then added 0.2 mL (0.0098 mmol) of the solution of iron(II) dichloride tetrahydrated. The dark blue beads were stirred at room temperature for 20 h on a rotating shaker. They were then drained, washed once for one hour and twice for 30 minutes with THF, once for 30 minutes and once for one hour with toluene and then dried under reduced pressure to afford the dark blue beads (7), which were stored in a glove box. The amount of iron was measured as:

Fe (ICP AES): 2.61%

Total loading of beads (7): 0.467 mmol Fe/g of beads

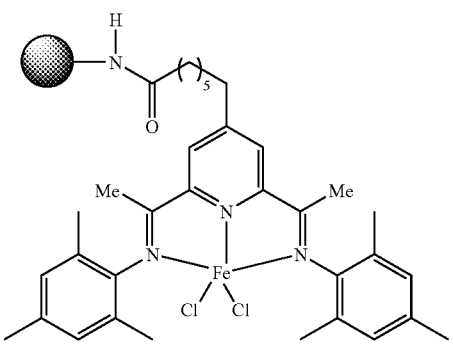

(7)

Figure 5:
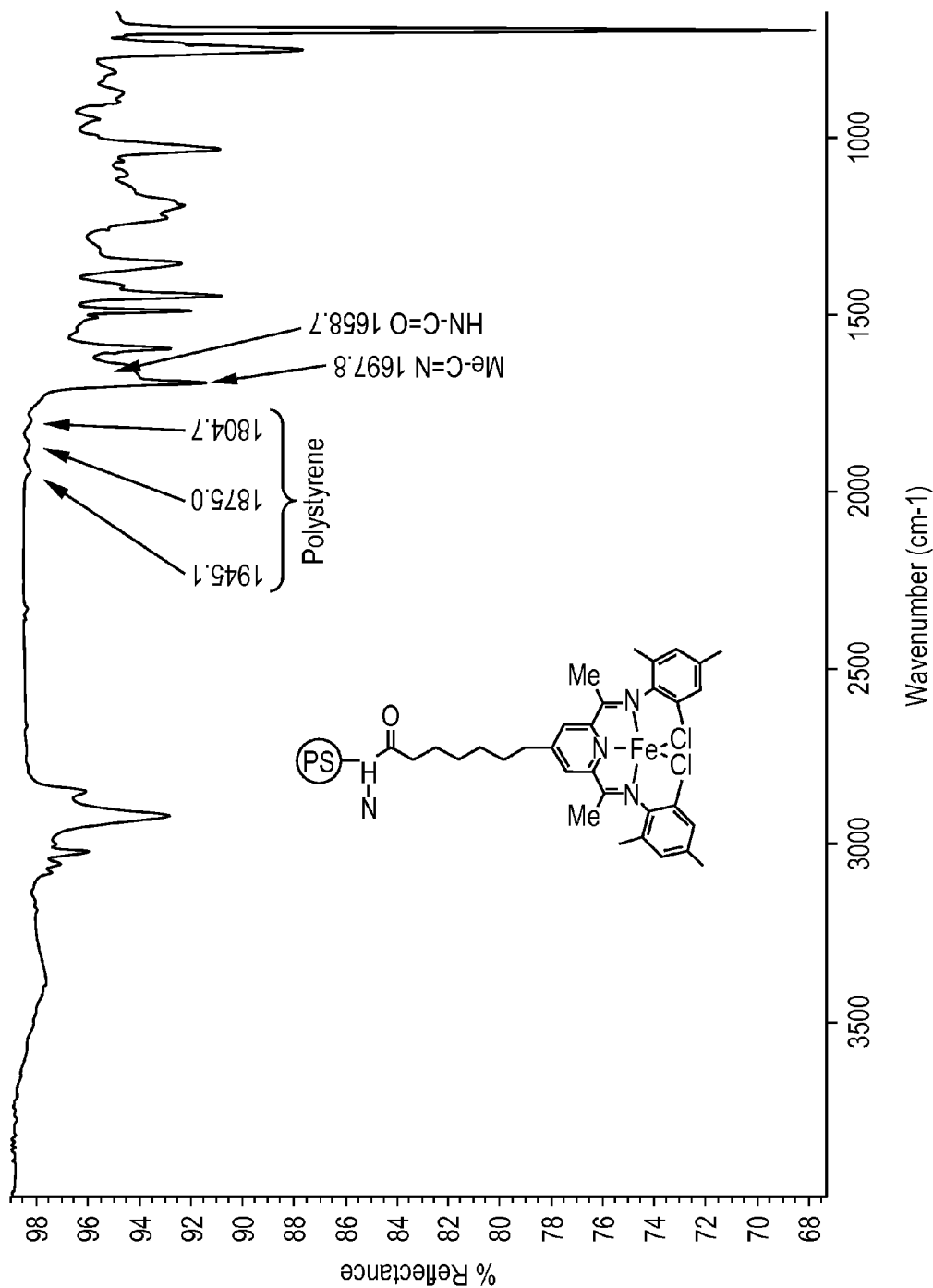
FIG. 5 represents the reflectance spectrum of catalyst VI expressed in % as a function of wave number expressed in $cm^{-1}$.

The reflectance spectrum of complex (7) is displayed in FIG. 5 representing the reflectance as a function of wave number.

Polymerisation of Ethylene

Example 1

12.91 mg (6.03 µmol) of beads (7) in 2 mL of toluene were placed in a 200 mL reactor, which was then flushed with argon for 5 min. Under argon, 5 mL of methylaluminoxane (MAO) (30% in toluene, 3500 eq.) were added, followed by 85 mL of toluene and the reactor was flushed with argon for 5 min. The temperature was raised to 50° C., the reactor was put under 20 bar of ethylene and the reaction mixture was stirred for 17 h. When the reaction mixture was back to room temperature and under argon, the solution was taken off, the beads were washed with ethanol and dried under reduced pressure to give 4.571 g of balls of polyethylene. The activity of beads (7) was measured in grams of polyethylene per mmole of Fe. These methods gave respectively:

Activity (g polymer/mmole Fe)=758

Residual Iron by ICP AES on polyethylene beads: 0.019%

Example 2

2.9 mg (1.35 µmol) of beads (7) in 2 mL of toluene were placed in a 200 mL reactor, which was then flushed with argon for 5 min. Under argon, 5 mL of MAO (30% in toluene, 16500 eq.) were added, followed by 85 mL of toluene and the reactor was flushed with argon for 5 min. The temperature was raised to 50° C., the reactor was put under 20 bar of ethylene and the reaction mixture was stirred for 3 h. When the reaction mixture was back to room temperature and under argon the solution was taken off, the beads were washed with ethanol and dried under reduced pressure to give 1.874 g of balls of polyethylene. The activity was:

Activity (g polymer/mmole Fe)=1388

The invention claimed is:

1. A method for preparing a supported catalyst component for the production of hollow beads of polyethylene comprising: (a) providing a first component characterized by the formula:

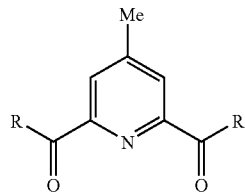

wherein R is an alkyl group having from 1 to 20 carbon atoms; (b) providing a porous functionalized bead of polystyrene characterized by the formula:

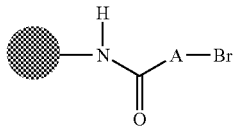

wherein A is a substituted or unsubstituted alkyl group having from 2 to 18 carbon atoms providing a flexible arm;
(c) creating a covalent bond between the component of subparagraph (a) and the porous functionalized bead of subparagraph (b) to produce a complex characterized by the formula:

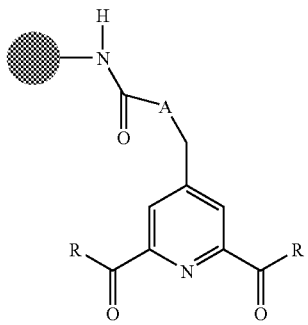

providing a first alkyl- or aryl-amine characterized by the formula:

$$R'-NH_2 \qquad (d)$$

wherein: R' is an alkyl group having from 1 to 20 carbon atoms, a substituted aryl group, or a substituted aryl group having substituents having from 1 to 20 carbon atoms;

providing a second alkyl- or aryl-imine characterized by the formula:

$$R''-NH_2 \qquad (e)$$

wherein: R" is an alkyl group having from 1 to 20 carbon atoms, a substituted aryl group, or a substituted aryl group having substituents having from 1 to 20 carbon atoms; provided that R" may be the same or different as R'; (f) reacting the complex of subparagraph (c) with said first and second alkyl- or aryl-amines of subparagraphs (d) and (e) to produce a bis-imine complex characterized by the formula:

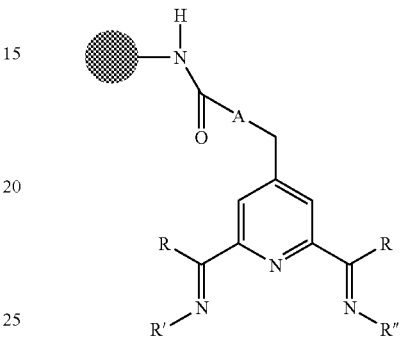

wherein R, R' and R" are as defined above and R' and R" may be the same or different; and
(g) reacting the bis-imine of subparagraph (f) with ferric chloride in a solvent to produce a catalyst component characterized by formula:

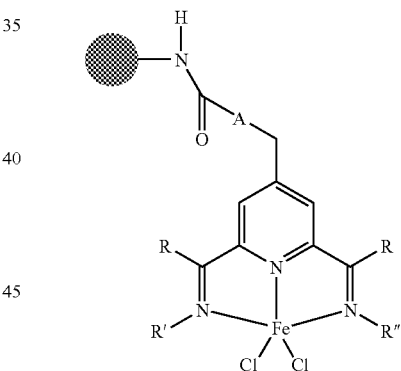

wherein R, R' and R" are as defined above.

2. The method of claim 1 wherein the alkyl group A contains from 3 to 6 carbon atoms.

3. The method of claim 1 wherein R is an alkyl group having from 1 to 4 carbon atoms.

4. The method of claim 1 wherein R' and R" are the same and are substituted or unsubstituted phenyl groups.

5. The method of claim 4 wherein said phenyl groups are substituted with isopropyl groups at positions 2 and 6.

6. The method of claim 4 wherein said phenyl groups are substituted with methyl groups at positions 2, 4 and 6.

* * * * *